US007483671B2

(12) United States Patent
Corbett et al.

(10) Patent No.: US 7,483,671 B2
(45) Date of Patent: Jan. 27, 2009

(54) PROCESSOR BASED FREQUENCY SELECTIVE JAMMING AND COMMUNICATIONS SYSTEM

(75) Inventors: Blaise L. Corbett, King George, VA (US); Michael L. Workman, Ruther Glen, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 705 days.

(21) Appl. No.: 11/134,608

(22) Filed: May 19, 2005

(65) Prior Publication Data

US 2006/0264168 A1 Nov. 23, 2006

(51) Int. Cl.
*H04K 3/00* (2006.01)
*H04Q 7/20* (2006.01)
*H04B 1/00* (2006.01)

(52) U.S. Cl. ............................ 455/1; 456/411; 375/130

(58) Field of Classification Search ..................... 455/1, 455/404.1, 404.2, 410, 411; 340/539.1, 568.1; 375/130; 342/14, 13
See application file for complete search history.

(56) References Cited

U.S. PATENT DOCUMENTS

| | | | | |
|---|---|---|---|---|
| 4,398,296 | A | 8/1983 | Gott et al. | 375/1 |
| 4,498,193 | A | 2/1985 | Richardson | 455/1 |
| 4,843,612 | A | 6/1989 | Brusch et al. | 375/1 |
| 4,914,699 | A | 4/1990 | Dunn et al. | 380/34 |
| 5,311,541 | A | 5/1994 | Sanderford, Jr. | 375/1 |
| 5,438,332 | A | 8/1995 | Adam et al. | 342/45 |
| 6,049,561 | A | 4/2000 | Pezzlo et al. | 375/132 |
| 6,118,805 | A | 9/2000 | Bergstrom et al. | 375/132 |
| 6,141,371 | A * | 10/2000 | Holmes et al. | 375/130 |
| 6,584,140 | B1 | 6/2003 | Lee | 375/132 |
| 6,658,044 | B1 | 12/2003 | Cho et al. | 375/135 |
| 6,809,669 | B1 * | 10/2004 | Robinson | 341/131 |
| 7,142,108 | B2 * | 11/2006 | Diener et al. | 340/539.1 |
| 2005/0020244 | A1 * | 1/2005 | Chang et al. | 455/410 |

* cited by examiner

*Primary Examiner*—Tilahun B Gesesse
(74) *Attorney, Agent, or Firm*—Scott R. Boalick, Esq.; Gerhard W. Thielman, Esq.

(57) ABSTRACT

In one general aspect, a communications system as described herein provides a wide-band jamming signal that is digitally created, conditioned, and modified by a processing based system to provide open data channels to authorized parties within a jammed communications band. The communications system modifies and maintains the open data channels to sustain communications between authorized devices. In addition, the communications system provides frequency hopping using the open data channels to supply secure data links to authorized devices within the jammed communications band while denying service to unauthorized communication nodes or devices.

17 Claims, 11 Drawing Sheets

PROCESSOR BASED FREQUENCY SELECTIVE JAMMING AND COMMUNICATIONS SYSTEM

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to communications systems, and in particular to communications within a jammed frequency spectrum.

BACKGROUND

Jamming communications channels, a form of electronic-countermeasure (ECM), has been a basic tool of electronic warfare (EW) for decades. While jamming communications channels is effective at preventing unwanted communications, jamming also prevents or degrades desired communications within the jammed frequency spectrum.

There are several conventional jamming methods that attempt to prevent unwanted communications and allow desired communications. For example, time domain multiplexing may be used to prevent unwanted communications and allow desired communications by switching between jamming and communicating on a channel. A similar method shifts the jammed frequency band and the communications channel so that the two signals do not intersect in a frequency channel. A disadvantage of both of these methods is waiting for the RF energy to clear the desired channel space before the previously jammed channel can be used for communication.

Another method creates open channels through a jammed spectrum using double side-band suppressed carrier (DSBSC) mixing of the jamming signal. DSBSC mixing jams a very wide spectrum of frequencies leaving open channels at the frequency carriers used for signal conversion. For example, jamming a signal spectrum between 1 MHz and 181 MHz having a clear channel at 91 MHz may be achieved by mixing a jamming signal between 1 MHz and 90 MHz with a carrier signal at 91 MHz. This provides a clear channel spacing of 2 MHz. However, there are major drawbacks to such a system.

For example, a DSBSC mixing system has difficulty controlling channel spacing and roll-off. In addition, the channel spacing may be extremely wide when compared to the transmission signal bandwidth that is actually needed to guarantee acceptable channel characteristics. Furthermore, the spacing of multiple channels depends on the selection of carrier frequencies and the ability to band limit the jamming signal to accommodate the communication channel selection. The channel separation also must be greater than the bandwidth of the jamming spectrum that is converted by a mixer. As a result, the DSBSC system requires a complex array of adjustable bandpass filters or strict limitations on channel spacing and location.

Yet another method is to "burn" through the jamming signal by overpowering the jamming signal. However, this approach is limited to systems with significant power output capabilities and the quality of the transmission may still suffer appreciably.

SUMMARY

In one general aspect, a communications system provides a wide-band jamming signal that is digitally created, conditioned, and modified by a processing based system to provide open data channels to authorized parties within a jammed communications band. The communications system modifies and maintains the open data channels to sustain communications between authorized devices. In addition, the communications system provides frequency hopping using the open data channels to supply secure data links to authorized devices within the jammed communications band while denying service to unauthorized communication nodes or devices.

In another general aspect, a communications system for jamming radio frequency (RF) communications of all unauthorized devices within a broadband frequency spectrum within a jammed area includes: a control node including a processor to determine RF channel information for one or more communications channels within the broadband frequency spectrum; one or more authorized jamming nodes to transmit RF signals to jam RF communications within the broadband frequency spectrum and to create notches within the broadband frequency spectrum clear of RF energy corresponding to the one more communications channels based on the RF channel information; and one or more communications devices authorized by the control node to communicate using the one or more communications channels located within the notches.

The communications channels may include a caretaker channel to provide synchronization data and channel information to authorized jamming nodes and communications devices. Furthermore, the communications channels may include a data channel for communications between authorized communications devices. A future data communications channel may be provided where communications on the communications channels are frequency hopped under direction of the control node such that the future data channel becomes a new data channel; the data channel becomes the caretaker channel, the notch corresponding to the caretaker channel is jammed, and a new future data and corresponding notch clear of RF energy are created.

The jamming node may include a processor to access noise data and apply a filter based on the communications channel data to determine jamming data to create a jammed broadband frequency spectrum with notches clear of RF energy corresponding to the communication channels.

The communications channels may include a beacon channel monitored by the processor of the control node to authorize communication devices to use the communications channels and to provide the channel information to authorized communications devices allowing the communications devices to enter the jammed area and communicate using the communications channels.

The communications channels also may include a beacon channel monitored by the processor of the control node to authorize jamming nodes to use the communications channels and to provide the channel information to authorized jamming nodes allowing the jamming nodes to enter the jammed area and begin jamming of the broadband frequency spectrum.

In another general aspect, a jamming node for jamming RF communications of all unauthorized devices within a broadband frequency spectrum includes a receiver to receive channel information from a control node for communications within the broadband frequency spectrum; a processor to access noise data and apply a filter based on the received channel data to determine jamming data to create a jammed broadband frequency spectrum with notches clear of RF energy corresponding to the communication channels; a broadband frequency transmitter under control of the processor to transmit signals to jam the broadband frequency spectrum; and a notched spectrum transmitter under control of the processor to create notches within the broadband frequency spectrum corresponding to the communications channels.

The communications channels may include a caretaker channel to provide synchronization data and channel information to authorized jamming nodes and communications devices. The communications channels also may include a data channel for communications between authorized communications devices. A future data communications channel also may be provided where communications on the communications channels are frequency hopped under direction of the control node such that the future data channel becomes a new data channel, the data channel becomes the caretaker channel, the notch corresponding to the caretaker channel is jammed, and a new future data and corresponding notch clear of RF energy are created.

In another general aspect, a communications node for a jamming communications system that jams radio frequency (RF) communications of all unauthorized devices within a broadband frequency spectrum includes: a receiver to receive channel information from a control node corresponding to notches within the jammed broadband frequency spectrum that are clear of RF energy; a processor to process the channel information to determine communications channels used by the communications system corresponding to the notches and to process a communication for transmission with the communications system; and a transmitter under control of the processor to transmit the communication using a determined channel identified by the channel information, where the processor is configured to provide frequency hopping using the communications channels to provide secure communications with the jammed broadband frequency spectrum.

The communications channels may include a caretaker channel to provide synchronization data and channel information to the communications device. The communications channels also may include a data channel for communications between the communications device and another authorized communications device. A future data communications channel may be provided where communications on the communications channels are frequency hopped under direction of the control node such that the future data channel becomes a new data channel, the data channel becomes the caretaker channel, the notch corresponding to the caretaker channel is jammed, and a new future data and corresponding notch clear of RF energy are created.

The communications channels also may include a beacon channel to transmit an authorization code by the transmitter under control of the processor to request authorization to communicate using the communications channels and to receive the channel information when authorized by the control node.

In another general aspect, a method of jamming radio frequency (RF) communications of all unauthorized devices within a broadband frequency spectrum within a jammed area includes: determining RF channel information for one or more communications channels within the broadband frequency spectrum; transmitting RF signals to jam RF communications within the broadband frequency spectrum based on the RF channel information; creating notches in the broadband frequency spectrum clear of RF energy corresponding to the one more communications channels; and communicating using the one or more communications channels located within the notches. Determining the RF communications channels may include determining a caretaker channel to provide synchronization data and channel information to authorized devices. Determining the RF communications channels also may include determining a data channel for communications between authorized devices.

Additionally, the method may include: determining a future data communications channel; frequency hopping the communications channels where the future data channel becomes a new data channel and the data channel becomes the caretaker channel; jamming the notch corresponding to the caretaker channel; and creating a new future data and corresponding notch clear of RF energy. The method also may include determining a beacon communications channel; monitoring the beacon channel for a device seeking authorization; determining the devices is authorized; and providing synchronization and the channel information to the authorized device to allow the device to enter the jammed area and communicate within the jammed broadband frequency spectrum.

Other features will be apparent from the description, the drawings, and the claims.

DETAILED DESCRIPTION

A communications system as described herein provides a wide-band jamming signal that is digitally created, conditioned, and modified by a processing based system to provide open data channels to authorized parties within a jammed communications band. The communications system modifies and maintains the open data channels to sustain communications between authorized devices. In addition, the communications system provides frequency hopping using the open data channels to supply secure data links to authorized devices within the jammed communications band while denying service to unauthorized communication nodes or devices.

Figure 1:
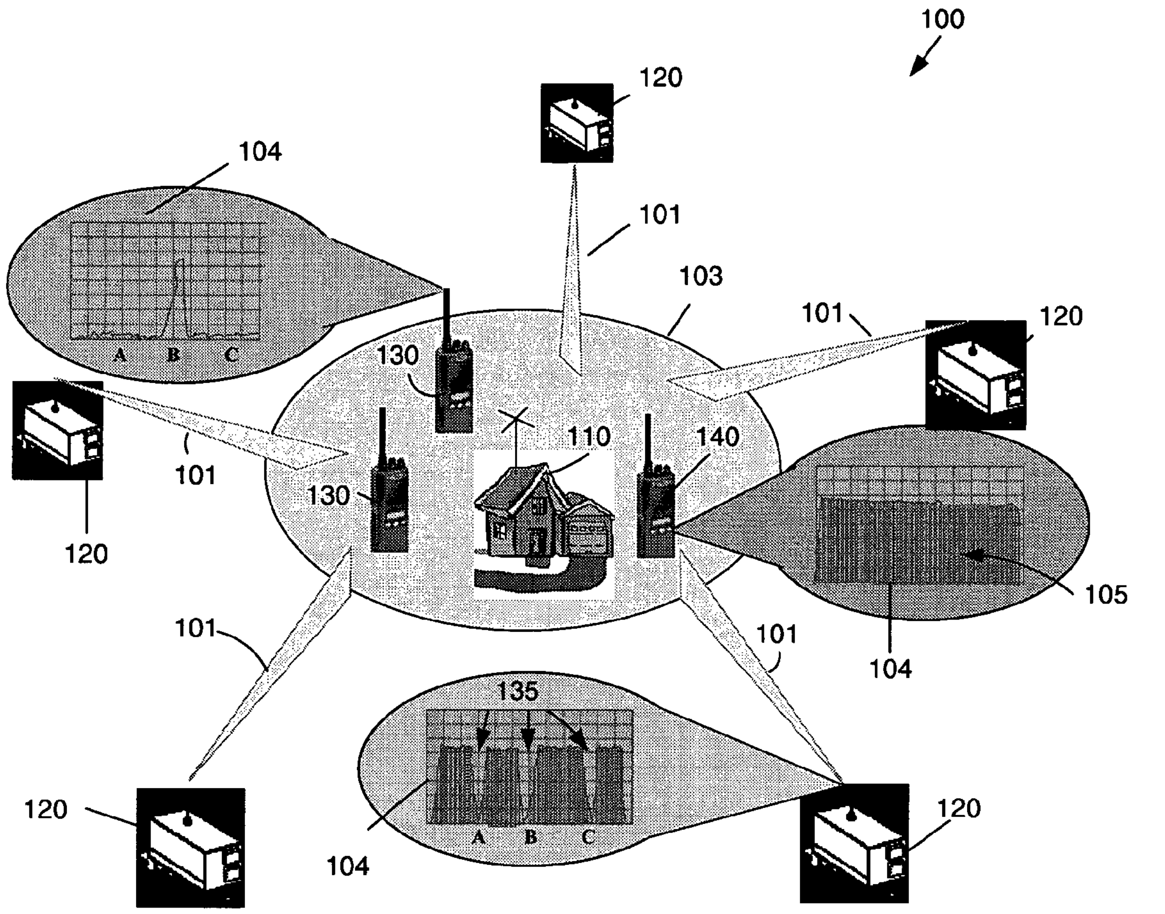
FIG. 1 is an exemplary communications system to deny RF communications by unauthorized parties within a local area while providing RF communications to authorized parties.

As shown in FIG. 1, a communications system 100 generates a broadband jamming signal 101 to prevent unauthorized communications within a jammed area 103 while supporting frequency hopping communications of authorized entities within the jammed frequency spectrum 104.

The communications system 100 includes at least three sub-systems: a control node 110, a jamming node 120, and a communications node 130. For example, FIG. 1 illustrates five jamming nodes 120 to jam the broadband frequency spectrum 104 within a jammed area 103 around a control node 110. Three communications devices are located within the jammed area 103. Two of the communications devices are communications nodes 130 and are authorized by the control node 110 to communicate within jammed frequency spectrum 104. The third communications device 140 is not authorized and is unable to communicate within the jammed area 103 as the entire frequency spectrum 104 appears jammed with noise 105 to the device 140.

The control node 110, jamming nodes 120, and communications nodes 130 may be implemented from a fixed site, such as for example, a land based area and/or structure, or the nodes may be mobile, such as, for example, a vehicle, a watercraft, or an aircraft. In addition, the communications nodes also may be personal devices, such as, for example, personal communication devices like "walkie talkies" that are adapted to the control node's caretaker channel allowing frequency hopping of the transmissions in time with the spectrum notches of the jamming nodes, as described in further detail below.

It will be understood from the following description and the drawings that the number of nodes shown in FIG. 1 is for illustration only and that any number of the different types of nodes may be implemented within the jammed area 103 according to the drawings and description provided below. For example, the control node 110 may be located outside of the jammed area 103, the nodes may enter and leave the jammed area 103, and more than one control node may be provided as explained in further detail below.

The communications system 100 provides frequency space for at least four communication channels within the jammed frequency spectrum 104, such as, for example, a beacon channel (not shown), a caretaker channel "A", a data channel "B", and a future data channel "C." Each of these channels is cleared of RF energy provided by a corresponding "notch" 135 within the jammed broadband frequency spectrum 104 created by the jamming node 120 under direction of the control node 110. The beacon channel provides a communications link between the control node 110 and any node of the communications system 100 (e.g., another control node 110, a jamming node 120, or a communications node 130) that seeks authorization to operate within the jammed area 103. The caretaker channel A is used as a communication link between the control node 110 and all other authorized nodes to provide clocking, coding, and channel frequency information that allow synchronization of the nodes and channel hopping. The data channel B is used as a communication link between communication nodes 130. The future data channel C is determined by the control node 110 and cleared of RF energy by the jamming node 120 for channel hopping.

When hopping is initiated, the future data channel C becomes the new data channel B, the old data channel B becomes the new caretaker channel A, the old caretaker channel A is jammed, and the control node 110 computes a new future data channel C for the next hop. This process may be continued by the control node 110 and jamming nodes 120 when jamming an area 103 to provide secure communications on clear channels within the jammed broadband frequency spectrum 104. Because the communications system 100 is processor based and digitally controlled, precise notches may be quickly created to provide agile frequency hopping within the broadband frequency spectrum 104. As the notches are created, the frequency hopping occurs at a rate faster than may be detected by unauthorized entities. As a result, secure communications are provided within the broadband frequency spectrum while denial of service to unauthorized parties is maintained.

Receiver Function

Figure 2:
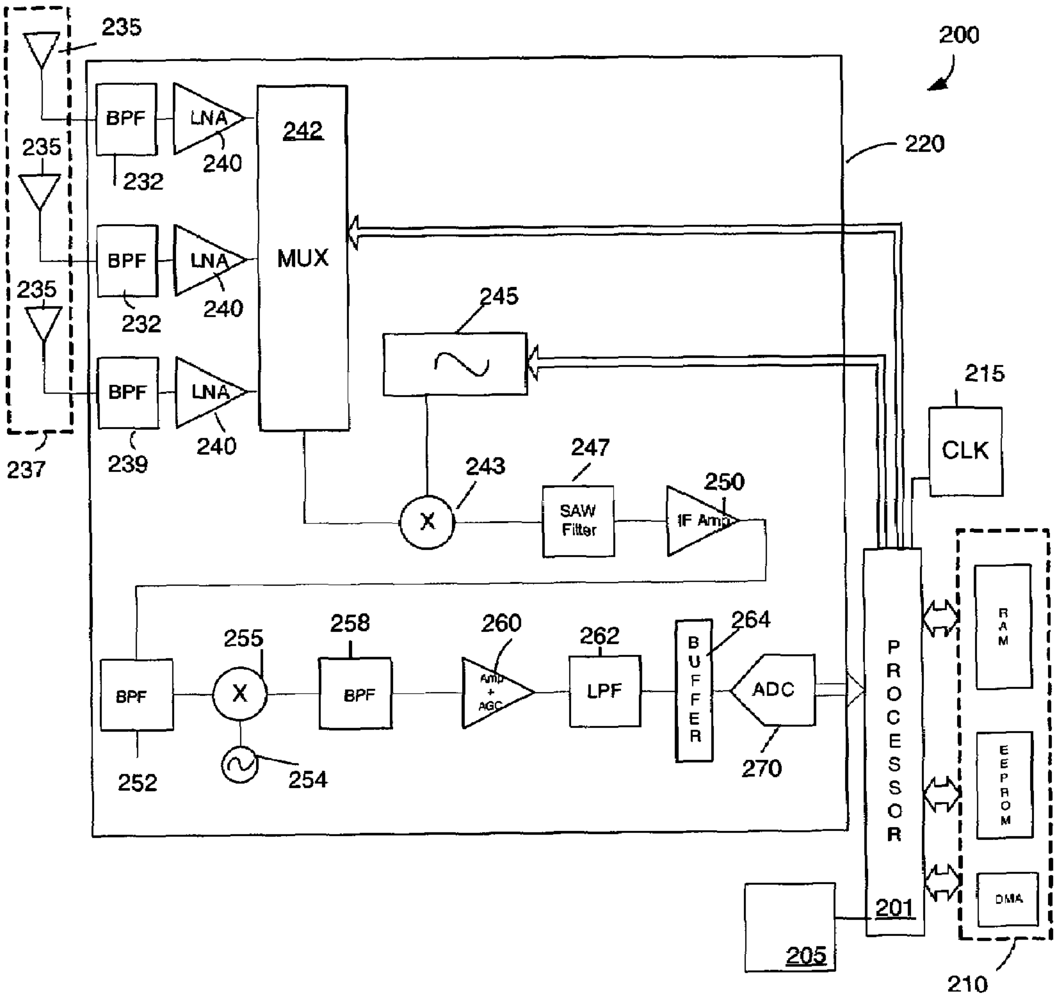
FIG. 2 is an exemplary receiver function for use in the nodes of the communications system of FIG. 1.

FIG. 2 shows one example of the receiver function 200 for use by the nodes in the communications system 100 of FIG. 1. As shown in FIG. 2, the receiver function 200 may be implemented using a processing device 201, an input/output interface 205, one more memory devices 210, a clock 215, and a receiver circuit 220. The receiver circuit 220 is controlled by the processing device 201 and is configured as a super-heterodyne receiver. The receiver 220 may be configured by the processing device 201 to receive communications from other nodes within the communications system 100 using one of the communications channels (e.g., the beacon, the caretaker channel, or data channel) provided within the broadband frequency spectrum 104.

The processing device 201 may be implemented using a general-purpose or a special purpose computer, such as, a processor, a digital signal processor (DSP), a microcomputer, a microprocessor capable of responding to and executing instructions in a defined manner. The processing device 201 may run one or more software applications to command and direct the processing device 201. The software applications may include a computer program, a piece of code, an instruction, or some combination thereof, for independently or collectively instructing the processing device 201 to operate as desired. The processing device 201 also may access, store, and create data in response to the applications.

The applications and data may be embodied permanently or temporarily in any type of machine, component, physical or virtual equipment, storage medium, or propagated signal wave capable of providing instructions to or being interpreted by the processing device 201. In particular, the applications and data may be stored on a storage medium or device 210 including volatile and non-volatile memories (e.g., a read only memory (ROM), a random access memory (RAM), a flash memory, a floppy disk, a hard disk, a compact disk, a tape, a DROM, a flip-flop, a register, an SRAM, DRAM, PROM, EPROM, OPTROM, EEPROM, NOVRAM, or RAMBUS), such that if the storage medium or device 210 is read by the processing device 201, the specified steps, processes, and/or instructions are performed and/or the desired data is accessed or stored. Multiple types of memories and mediums may be used and are collectively referred to as the storage device 210.

The input/output interface 205 allows a user or operator to interact with the processing device 201. The input/output interface 205 may include any number of peripheral devices to input commands and data and output or present data to a user. For example, the interface 205 may include one or more of a key pad, a keyboard, a mouse, a touch pad, a button, a switch, a lever, a dial, a speaker, a microphone, and a display.

According to the receiver function 200, an RF signal is received by an antenna 235 of the array 237. In this configuration, one or more antennas 235 may be implemented in an array 237, such as, for example, an omni-directional array or directional array. Although either array may be used, a directional array may provide better gain between nodes of the communications system 100. The received signal passes through a filter 239 (e.g., a band pass filter (BPF)) and a low noise amplifier (LNA) 240. The processing device 201 selects an antenna 235 from the array 237 for monitoring based on the desired receiving frequency using a selection device 242, such as, for example, a multiplexer or analog switch. The received signal is input to a mixer 243 and is mixed down with a signal from a digitally controlled oscillator (DCO) 245 that is controlled by the processing device 201. The mixed signal passes through a filter 247 (e.g., SAW filter) for image rejection to generate an intermediate frequency (IF) signal. The IF signal is then amplified by amplifier 250, filtered by a filter 252 (e.g., a BPF) and mixed down with a signal from a local oscillator 254 by mixer 255. The mixed down signal may be filtered 258 (e.g., by a BPF) for image rejection, amplified by an automatic gain control amplifier 260 and filtered again 262 (e.g., by a low pass filter (LPF)). The signal may be buffered 264 and converted to digital data by an analog to digital converter (ADC) 270. The receiver function 200, as shown in FIG. 2, uses time division multiplexing to access the desired receiving frequency channel; however, if real time monitoring of multiple channels is desired, additional receiver circuits 220 may be added.

Transmitter Function

Figure 3:
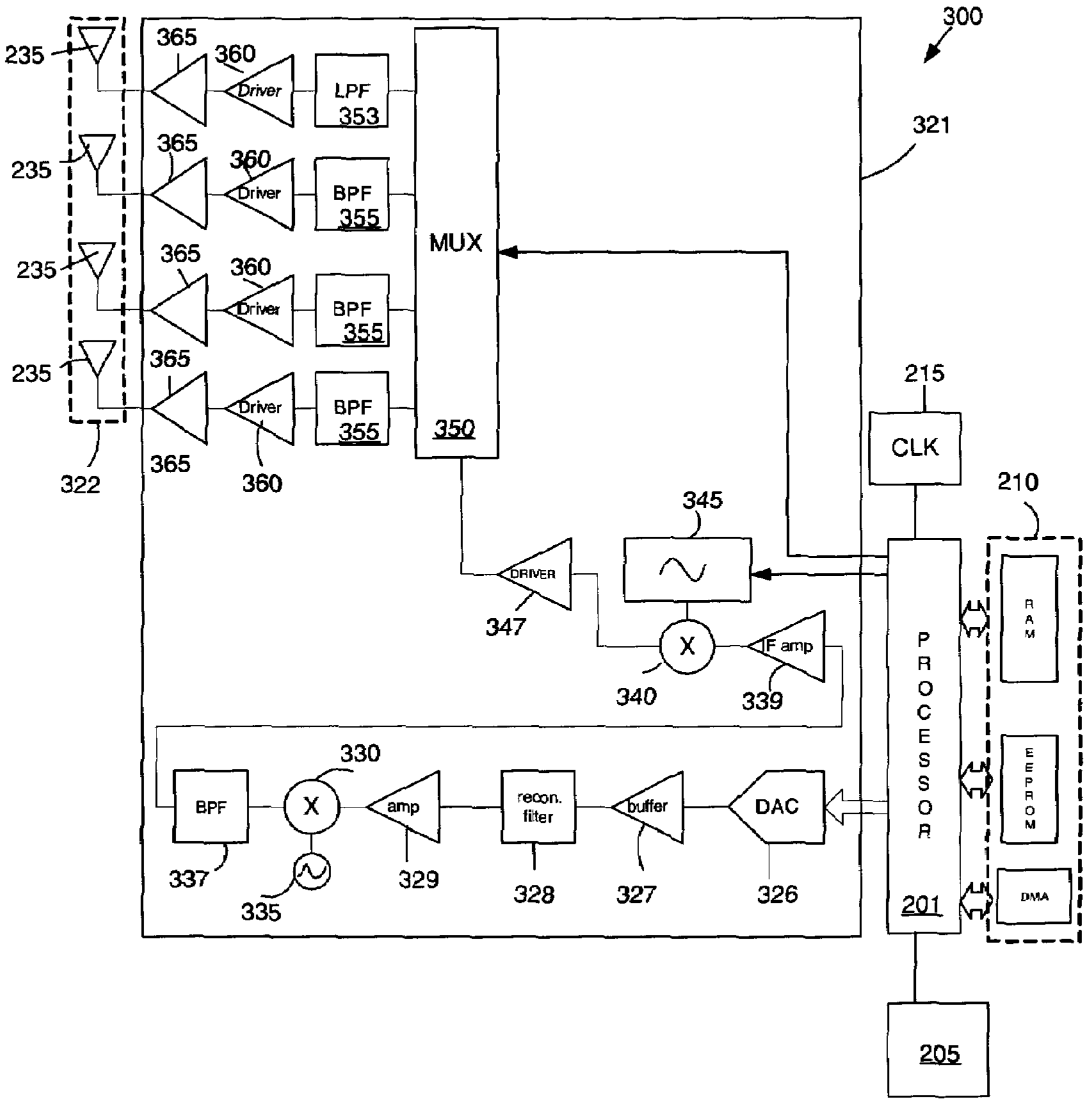
FIG. 3 is an exemplary transmitter function for using in the nodes of the communications system of FIG. 1.

FIG. 3 shows one example of the transmitter function 300 for use by the nodes of the communications system 100 shown in FIG. 1. As shown in FIG. 3, the receiver function 300 may be implemented using a processing device 201, an input/output interface 205, one more memory devices 210, a clock 215, and a transmitter circuit 321. The transmitter circuit 321 may be configured as a super-heterodyne transmitter. The transmitter circuit 321 is controlled by the processing device 201 to transmit signals to the other nodes of the communications system 100. The transmitted signals may be a data packet for the beacon channel, a data packet or stream for the caretaker channel, or data for the data channel. In this configuration, one or more antennas 235 may be implemented in an array 322, such as, for example, an omni-directional array or directional array. Although either may be used, a directional array may provide better gain between nodes of the communications system 100.

Digital information that is to be transmitted is input to a digital to analog converter (DAC) 326 from the processing device 201 or from a memory device 210 that is accessed by DAC 326 as needed. The analog signal is output from the DAC 326 and is buffered 327 to a reconstruction filter 328 and amplified by an amplifier 329. The amplified signal is input to a mixer 330 and is up mixed with a signal from a LO 335 to generate an IF signal. The IF signal is filtered 337 (e.g., by a BPF) and amplified 339 (e.g., by IF amplifier). The IF signal is input to a mixer 340 and is up mixed with a signal from a DCO 345 (under control the processing device 201). The mixed signal is amplified by a driver 347 and buffered in a selection devices 350, such as, for example, an analog switch or multiplexer controlled by the processing device 201. A desired frequency is selected by the processing device 201, and the signal is filtered 353, 355 (e.g., by a BPF or a LPF) for the appropriate frequency band and amplified by a driver 360 and amplifier 365 pair for transmission by an antenna 235 of the array 322 as selected by the multiplexer 350. The transmitter circuit 321, as shown in FIG. 3, uses time division multiplexing for transmissions; however, if real time transmission of multiple signals is desired, additional transmitters 321 may be added.

Control Node

Figure 4:
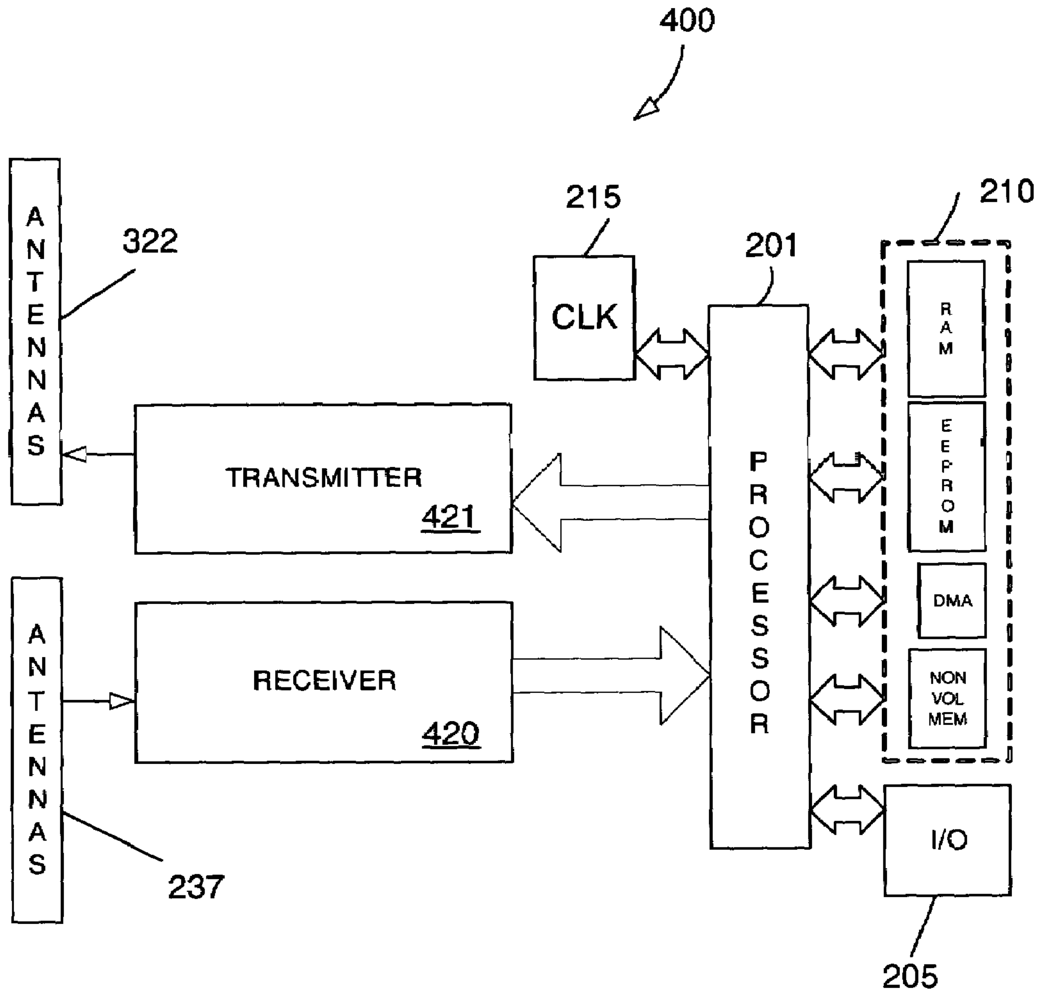
FIG. 4 is an exemplary control node for use in the communications system of FIG. 1.

The control node 110 is the caretaker of the entire communications system 100. FIG. 4 shows one implementation 400 of a control node 110. As shown in FIG. 4, the control node 110 may include a processing device 201, an input/output interface 205, one more memory devices 210, and a clock 215. The control node 110 also includes a receiver circuit 420 and a transmitter circuit 421 that are controlled by the processing device 201. In addition, one or more antennas arrays 237, 322 are connected to the transmitter and receiving circuits for communications with authorized nodes or nodes seeking authorization.

The processing device 201 determines what frequencies within the jammed broadband frequency spectrum are open for communication. The processing device 201 may determine the open frequencies using any number of methods, such as, for example, a random generator algorithm application or by accessing the frequencies from a storage device 210.

The processing device 201 also determines synchronization of all of the nodes in the communications system 100 for channel switching. Synchronization may be accomplished by transmitting data packets with timing, synchronization, and channel information to the authorized nodes (e.g., jamming nodes 120 and communication nodes 130) using the caretaker channel or the beacon channel. Each sub-system of the communications system 100 includes a clock that may be synchronized with the control node 110 using the information transmitted in the data packets.

The processing device 201 of the control node 110 also monitors the beacon channel for jamming nodes 120 or communication nodes 130 that wish to communicate within the jammed area 103 (e.g., a mobile nodes entering or coming online in the jammed area). The control node 110 determines if the nodes are authorized (e.g., using an authorization code or identification supplied by the node) and provides the authorized nodes with data (e.g., timing, synchronization, and channel information). The processing device 201 opens the beacon channel intermittently at predetermined channels and intervals. Different channels and intervals may be used; however, once jamming of any area begins, the predetermined beacon channel may remain fixed for the duration of the jamming. Each subsystem may include an integrated digital clock 215 and a memory device 210, such as, for example, an EEPROM that includes programming allowing the subsystem to be programmed to seek or respond to the beacon transmitted by the control node 110.

The processing device 201 also may determine or assign permission and/or priority levels to all the authorized nodes (e.g., jamming node 120 or communications node 130) in the jammed area 103. The permission levels may be used, for example, to grant access to the open channels (e.g., when, how often, and/or how long nodes may access the communication channels). The permission may be dynamically adjusted to ensure changes in priority are addressed and that the highest priority communications have immediate access to the communications channels if needed. The permission levels may be based on codes stored at the nodes of the communications system 100 and/or they may be determined/assigned by the control node 110.

The control node 110 provides the caretaker channel frequency data to authorized communication devices using data packets transmitted over the beacon channel. Once received, the authorized device tunes to the caretaker channel. The control node 110 then provides communication channel location information to authorized devices using the caretaker channel. The processing device 201 of the control node 110 also transmits the frequency channel information and timing information for a new hopped channel (i.e., the future channel) to all authorized nodes. In summary, the control node 110 provides channel locations to all authorized nodes in the jammed area using either the beacon channel (e.g., for communications devices entering the jammed area) or the caretaker channel (e.g., for systems already communicating with the control node 110).

In one implementation, the control node 110 may communicate only using the intermittent beacon channel and the caretaker channel. In this implementation, the control node 110 does not have to access the current data channel. In addition, the control node 110 need not perform any jamming function; it is sufficient that the control node 110 relays the necessary jamming information to all other system nodes. The interaction of the control node 110 and the various subsystems is described in further detail below.

Jamming Node

Figure 5:
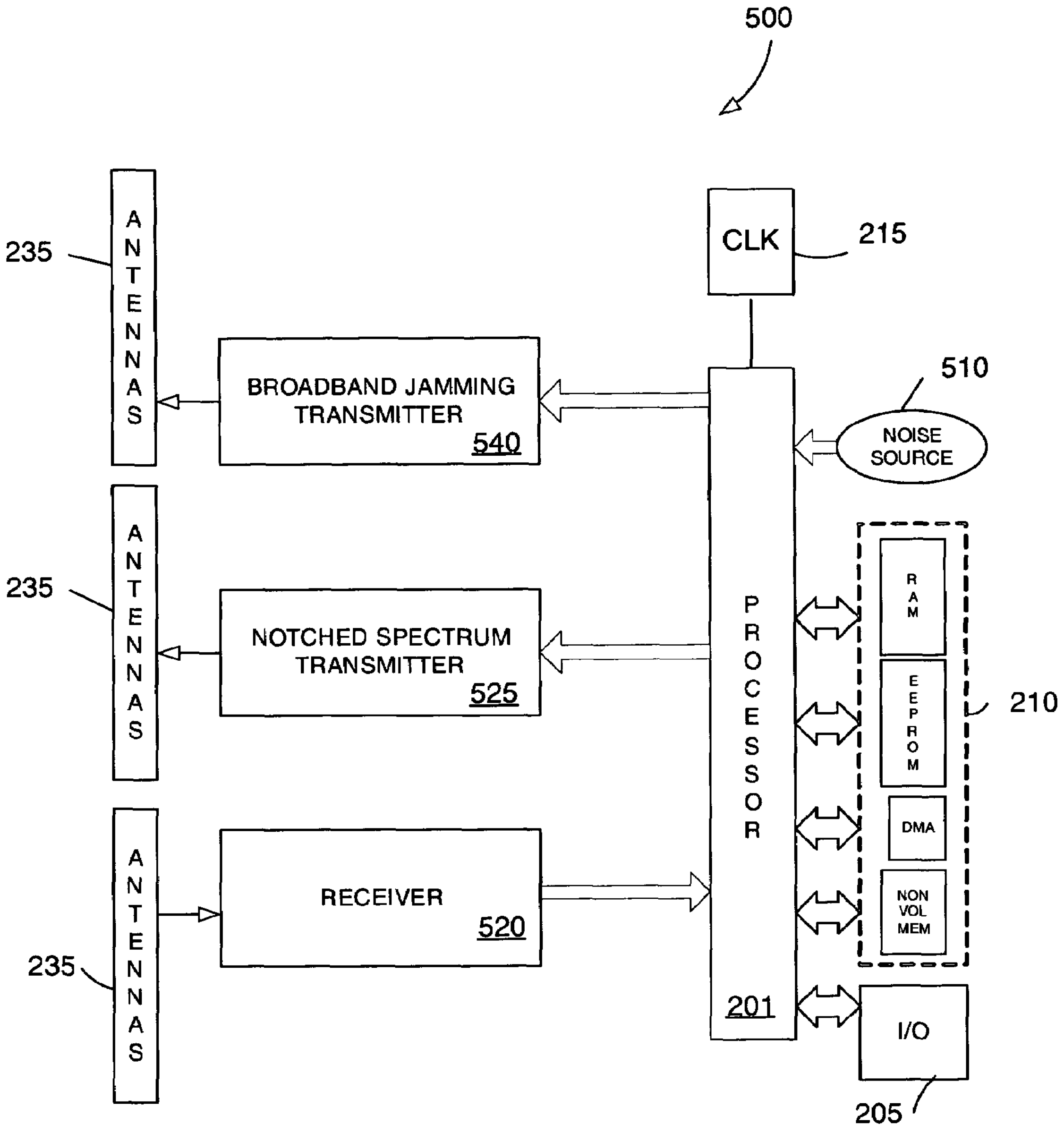
FIG. 5 is an exemplary jamming node for use in the communications system of FIG. 1.

As shown in FIG. 5, one implementation 500 of the jamming node 120 may include a processing device 201, an interface 205, a clock 215, antennas 235, a noise source 510, a receiver 520, a notched spectrum transmitter 525, and a broadband jamming transmitter 540. The jamming node 120 may be physically implemented as part of the control node 110 or as one or more separate jamming nodes 120.

The jamming node 120 collects and translates the jamming information data received from the control node 110. The jamming information data from the control node 110 may include information, such as the channel frequencies that are to be used, timing data, any special data encoding, as well as commands that would convey control to any other node (e.g., a priority communication node or an incoming control node requesting control hand-off).

The random noise source 510 may used to create random noise for the jamming signal if true random noise is desired; otherwise, the processing device 201 may create the random noise spectrum values required for the jamming using a random number generator. Once generated, the noise spectrum values may be stored in a storage device 210. The jamming node 120 also calculates the filter coefficients to execute the digital filtering of the noise spectrum. The filter coefficients may be stored in the storage device 210. The processing device 201 accesses the noise spectrum values and the filter coefficients from the storage device 210 and digitally filters the noise spectrum values to create notches at the desired spectrum locations indicated by the control node 110 (which coincide with the communications channels of the jamming system). The digital data is converted into an analog signal and the notched spectrum band is converted into the desired frequency band by mixing of the analog signal by the transmitter 525 under control of the processing device 210. The notched band is transmitted at the appropriate frequency using a desired frequency filter, power amplifier, and directive antenna allowing communications by authorized nodes on channels within the notches. As hopping is initiated, the jamming nodes 120 continually create and close the notches based on data received from the control node 110 indicating the desired channels.

If the jamming node 120 is implemented as a physically separate entity from the control node 110, the jamming node 120 may include a receiver circuit 520. In this instance, the receiver 520 establishes a communications link between jamming node 120 and the control node 110 to receive data including timing, synchronization, and channel information. The data is received by one of a number of broadband antennas 235 that are selected using a selection device (e.g., an analog switch or MUX) controlled by the processing device 201. The received modulated signal is then down converted using a common super heterodyne down converter making use of a DCO controlled by the processing device 201. The processing device 201 demodulates the data signal received from the control node 110 to determine appropriate channel information and places the channel information into a storage device 210. The channel information is used by the processing device 201 to monitor the caretaker channel and to create the notches using the notched spectrum transmitter 525. For example, a memory, such as, for example, an EEPROM may be used for non-volatile memory storage of programmed codes and algorithms. The receiver 520 may be implemented using the receiver 220, as explained for the receiver function 200 shown if FIG. 2.

A digital filter may be used in conjunction with the notched spectrum transmitter 525 to generate notches in the jammed frequency spectrum that are clear of RF energy. A digital filter application, such as, for example, an Infinite Impulse Response (IIR) filter or a windowed Finite Impulse Response (FIR) filter may be run by the processing device 201. The processing device 201 implementing the filter determines filter coefficients. Generally, an IIR filter has fewer coefficients and digital filtering operations may be optimized for speed. A FIR filter may be used for phase-modulated communications (e.g., BPSK modulation); however, the number of filter coefficients may be several orders of magnitude larger than using an IIR filter (having a corresponding increase in processing time). If the phase characteristics for the jamming communications system 100 are not important, an IIR filter may be used to provide notching of the jamming spectrum based on processing speed considerations for both the calculation of coefficients and the filtering calculations. Methods for determining the coefficients of either FIR filters or IIR filters are well known to those familiar with the art and algorithm packages for determining coefficients can be readily obtained and, therefore, are not discussed in further detail.

The processing device 201 accesses a storage device 210 to obtain the noise spectrum information. As described above, the noise spectrum information may be generated by an active noise source 510 or artificially generated by the processing device 201 using a random number generator algorithm. The processing device 201 processes the noise spectrum data using the digital filter, for example, an IIR or FIR filter, to create frequency notches in the jammed spectrum that are clear of interfering RF energy. Using the filter, the processing device 201 controls the notched spectrum transmitter circuit 525 to provide notching of the jammed spectrum for communications (e.g., voice and other data transmissions). The processing device 201 uses the received channel data in combination with the filter and noise source to modify the notches for frequency hopping. For example, as the communications channels are hopped, a new notch is created for the future data channel that is free of RF energy and the previously clear notch corresponding to the caretaker channel is jammed. The notched spectrum transmitter may be implemented using the transmitter 325, as explained for the transmitter function 300 as shown in FIG. 3.

The width of the broadband jammed spectrum that is generated may be based on a number of factors, including, for example, the speed of the processing device 201, the speed of transfer between the storage device 210 and the processing device 201, the rate of sampling of the collected noise spectrum data (e.g., for an active noise source 510), and the data throughput rate of the transmitter (e.g., the DAC speed). For example, if a noise signal bandwidth is to be notched 100 MHz, then the digital filtering by the processing device 201 for an individual sample is made in 10 ns, with a memory transfer rate of 200 mega-samples per second (MSPS). For 8-bit calculations, the memory transfer rate is 200 Mbytes per second and for 16-bit calculations is 400 Mbytes per second. An ADC for the active noise source 510 may sample at a minimum of 200 MSPS, and the DAC may achieve a data throughput rate of 200 MSPS. In another example, processor calculation times of 1.67 ns, memory transfer rates of 38

Gbytes per second, ADC sample rates of 400 MSPS, and DAC rates of 600 MSPS may be used; however, the sample rate of the active noise source 510 and its corresponding ADC may be a limiting factor. If an active noise source is desired, the frequency bandwidth may be limited to 200 MHz. If wider bandwidths are desired, a random noise value generator may be employed. Of course bandwidth capabilities of the communications system 100 will increase with even higher calculation, transfer, sample, and conversion rates based on the components used to implement the system.

The bandwidth of the notch is controlled by the filtering function. Generally, the more narrow the notch, the greater the number of coefficients that are used. Alternatively, to minimize the number of coefficients, the digital signal to be notched (e.g., the jamming spectrum values) may be passed through the digital filtering algorithm a number of consecutive times by the processing device 201 using a looping algorithm, or by multiple processing devices 201 using a pipeline algorithm. If low overhead direct memory access (DMA) controllers are used, the latter solution may be faster based on the desired characteristics of the notch.

Once digitally filtered, the spectrum data is directly provided to the DAC of the notched spectrum transmitter 520 by the processing device 201 or the spectrum data may be accessed by the DAC from the storage device 210 or buffer as needed. The configuration that is chosen is based on considerations, such as, for example, the DAC capabilities, the speed of the processing device 201, and the available on board RAM of the processing device 201. The DAC converts the digital data into an analog spectrum signal. The analog spectrum signal passes through a reconstruction filter and is amplified. The analog spectrum signal is then mixed to an IF where bandpass filtering may be used to eliminate any problematic spectrum images. The IF is mixed using a DCO controlled by the processing device 201 to the appropriate transmission frequency. A final band-pass or low-pass filter is applied to the signal to prevent unwanted image frequencies and the signal is amplified and transmitted by a selected antenna 235.

Figure 6:
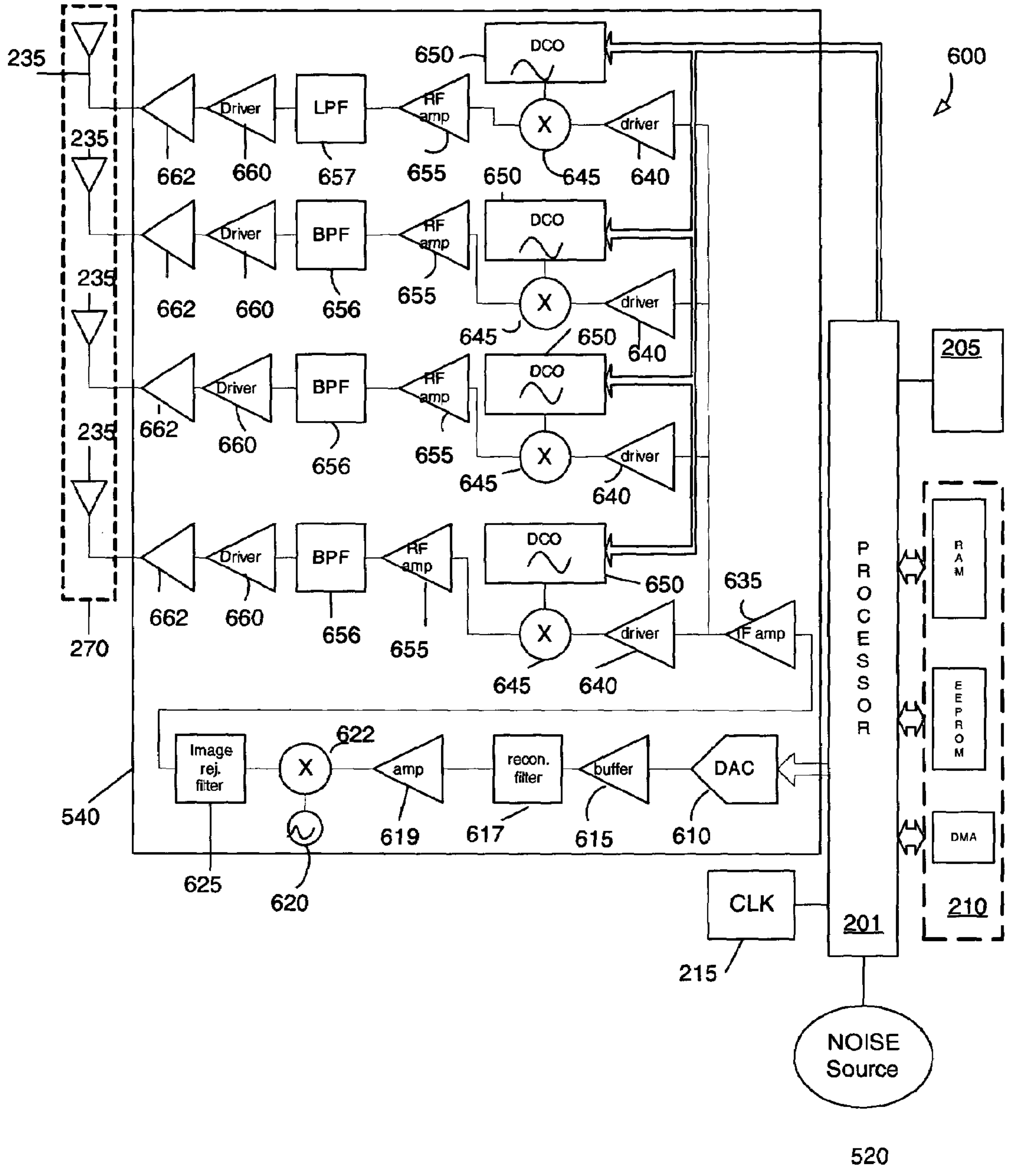
FIG. 6 is an exemplary broadband jamming transmitter for use in the jamming node of FIG. 5.

FIG. 6 shows an exemplary implementation 600 of the broadband jamming transmitter 540 for use in the jamming node 120 of FIG. 5. The primary difference between the notch transmitter 525 and the broadband jamming transmitter 540 is that the jamming spectrum data is not digitally filtered by the broadband jamming transmitter 540. The processing device 201 accesses the jamming spectrum information (e.g., generated by an active noise source 510 or artificially generated by the processing device 201 using a random number generator algorithm) from the storage device 210. The accessed jamming spectrum information is the same as that accessed for the notched spectrum transmitter 525. The jamming spectrum data is input to the DAC 610. The DAC 610 converts the digital data into an analog spectrum signal. The analog signal may be buffered 615 as needed. The analog spectrum signal passes through a reconstruction filter 617 and is amplified 619. The analog spectrum signal is then mixed with a signal from a local oscillator 620 by a mixer 622 to create an IF. The IF signal may be input to a filter 625 (e.g., a BPF) to eliminate any problematic spectrum images and is amplified 635. The amplified IF signal is split and provided to a number of drivers 640. Each driver 640 passes the signal to a mixer 645 where the signal is up mixed with signal provided by a DCO 650 that is provided for each appropriate transmission frequency. The processing device 201 manages each DCO 650 so that the jamming spectrum is mixed into the proper frequency bands.

For example, if jamming a frequency spectrum between 100 MHz and 450 MHz using a data spectrum 100 MHz wide, the entire spectrum may be asymmetrically broken into five parts. The notched band may be selected between 100 MHz and 200 MHz, and the notches may be placed between 100 MHz and 150 MHz. Some overlap of the spectrum signals may be provided to prevent gaps in the jamming band. The unfiltered spectrum is mixed to cover frequencies of 190 MHz to 290 MHz, 280 MHz to 380 MHz, and 370 MHz to 450 MHz. The number of allocations and the asymmetric division is dependent on the number of mixers, transmitters, and antennas characteristics of the jamming node 120.

Each mixed signal is provided to a RF amplifier 655, and a final band-pass 656 or low-pass filter 657 is applied to each signal to prevent unwanted image frequencies. The signal is amplified using a driver 660 and power amplifier 662 pair and transmitted by the directional antenna 235 of the array 670.

Figure 7:
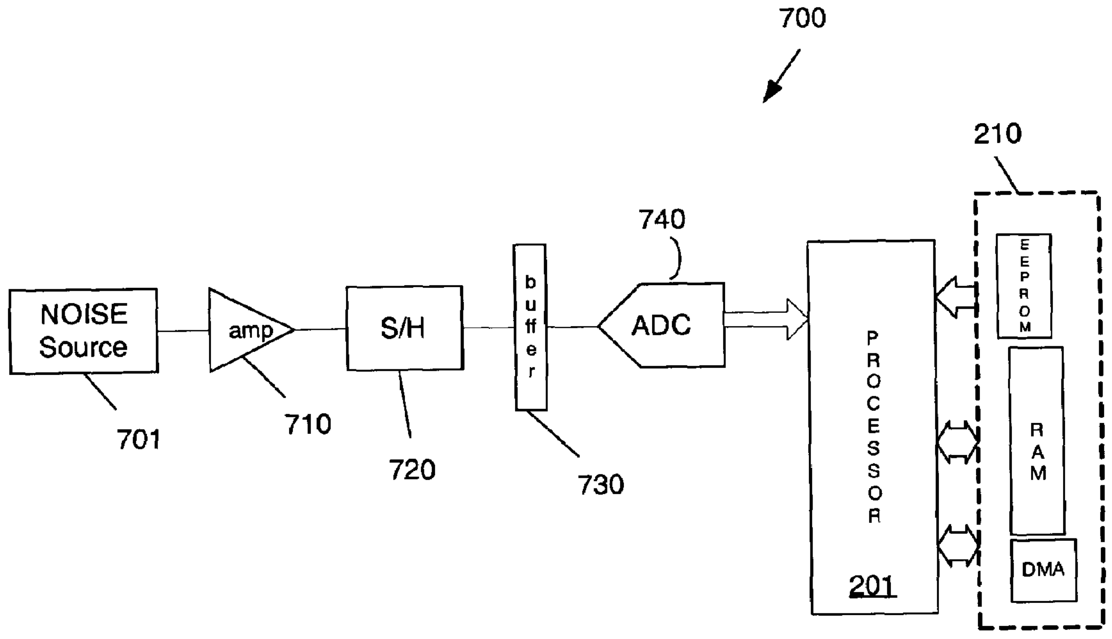
FIG. 7 is an exemplary active noise source for use the in the jamming node of FIG. 5.

FIG. 7 shows an implementation 700 for noise generation by the active noise source 510. As shown a noise source 701, such as, for example, a reverse biased junction diode in avalanche could provide a significant shot (Johnson) noise which may be and amplified 710 and input to a sample and hold circuit 720. The noise signal is then buffered 730 and converted to digital information by an ADC 740. The noise data may be stored in storage device 210 of the jamming node 120 for use by the processing device 201 to generate the jamming frequency spectrum and notches.

Communications Node

The communications node 130 encodes information for transmission on the data channel and then transmits the data signal over the authorized data channel frequency. The communications node 130 initiates communications with the control node 110 using the beacon channel. The communications node 130 provides an authorization code to the control node 110 to identify itself. The authorized code may be stored in the memory device 210 (e.g., an EEPROM) of the communications node 130. The communication link between the communications node 130 and the control node 110 is maintained using the caretaker channel or the beacon channel. Communications over the data channel may be encrypted. The encryption may be changed in real time by the control node with appropriate information supplied to the communications nodes using the caretaker channel.

Figure 8:
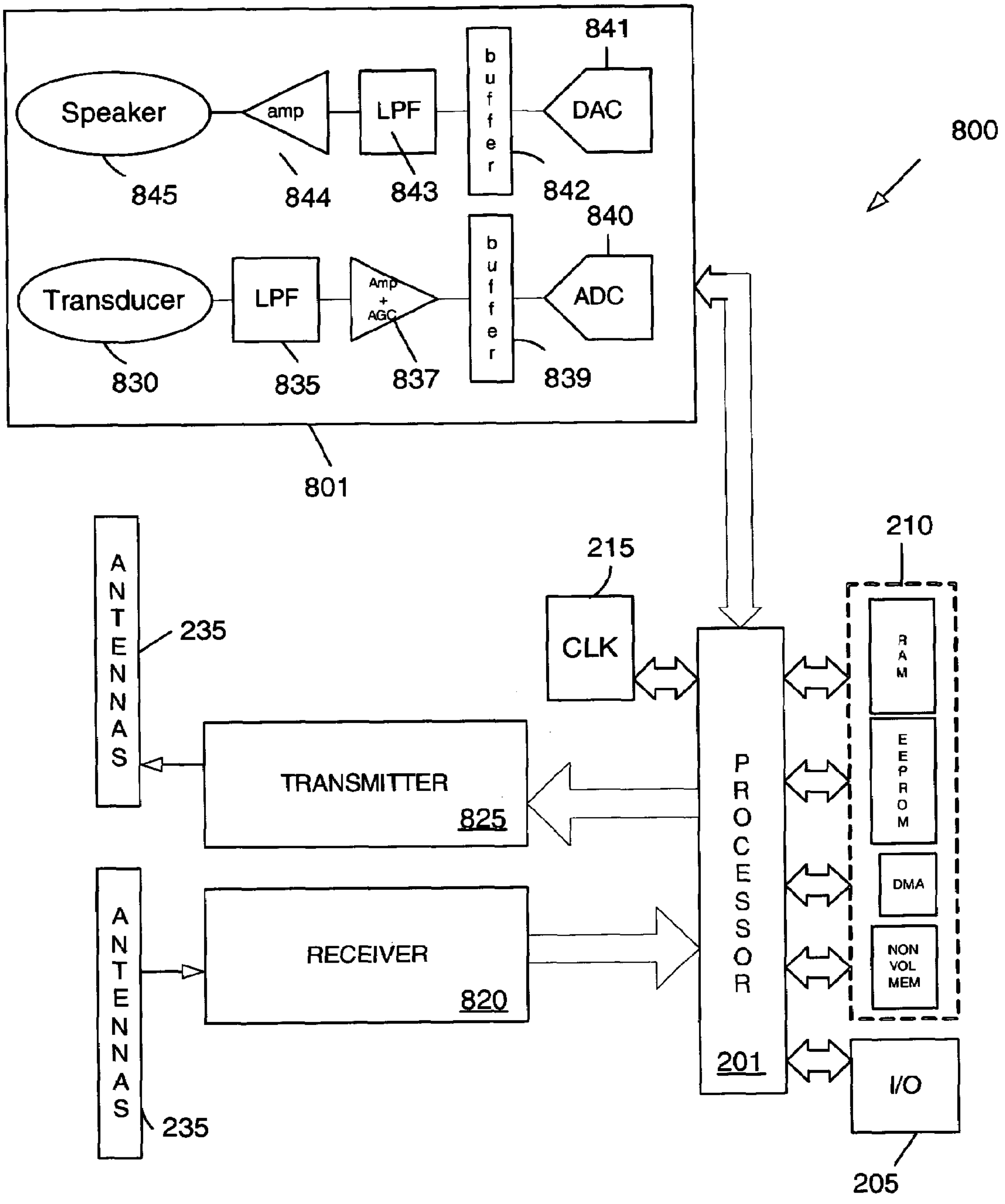
FIG. 8 is an exemplary communications node for use in the communications system of FIG. 1.

As shown in FIG. 8, one implementation 800 of the communications node 130 includes a processing device 201, an interface 205, a storage device 210, a clock 215 and one or more antennas 235, a data channel I/O system 801, a receiver system 820, and a transmitter system 825. The storage device 210 may be used for non-volatile memory storage for programmed codes and algorithms. As shown, the communications node 130 may be processor based; however, the data channel input and data channel transmission also may be implemented using an analog/digital hybrid system. A hybrid system allows conventional analog communications systems to be used in conjunction with the jamming communications system 100.

The communications node 130 may include one or more data interfaces (e.g., 205 and 801) to input and output data for communications over the data channel. The data channel I/O system 801 may be used to convert voice inputs to digital data for processing by the processing device 201, to convert digital data to voice signals. As shown in FIG. 8, the data I/O 801 includes a transducer 830 to convert voice signals to electrical signals. The electrical signals are input to a low pass filter 835 and an amplifier 837 with automatic gain control. Filtered and amplified, the voice signal may be buffered 839 for input to an ADC 840. The ADC 840 converts the analog signal to digital voice data which is passed directly to the processing device 201 for digital processing or to the storage device 210 where the processing device 201 may recover the voice data as needed.

The data I/O 801 also may include a DAC 841. The DAC 841 receives digital voice data from the processor 201. The digital voice data may be buffered 842, filtered 843, and amplified 844. The amplified analog voice signal is input to a speaker 845.

The receiver 820 receives data from the control node 110 using the caretaker channel or the beacon channel. The receiver 820 also receives the transmissions from other communications nodes 130 using the data channel. The receiver 820 may be implemented using receiver 220 as described for the receiver function 200 as shown in FIG. 2. Any signals received from the jamming communications system 100 pass through an appropriate antenna/filter/amplifier combination. The incoming signal may be selected by a selection device (e.g., an analog switch or multiplexer) under control of the processing device 201 based on channel information stored in the storage device 210 that is received from the control node 120. The signal is mixed down to the appropriate IF frequency using a DCO that is controlled by the processing device 201. A BPF, for example, a SAW filter may be used for image rejection. The signal passes through an amplifier and a second, optional filter for image rejection. The signal is down mixed again, filtered, amplified, low pass filtered and then is buffered into an ADC. The ADC passes the data directly to the processing device 201 or to the memory (where the data can be retrieved by the processing device 201 as needed). The communications node 130 may implemented with a single receiver that time division multiplexes the data, caretaker, and beacon channels, or multiple receiver subsystems may be used to monitor all channels continuously.

The transmitter 825 transmits data to the control node 110 using the caretaker channel or the beacon channel. The transmitter 825 also transmits digital data to other communications nodes 130 using the data channel. The transmitter 825 may be implemented using the transmitter 321 as described above for the transmitter function 300 shown in FIG. 3. The digital data for transmission may input to a DAC by the processing device 201 or from the storage device 210. The digital data may include voice data for the data channel, or requested data for the control node 110. The DAC converts the digital data to an analog signal using a buffer, reconstruction filter, and amplifier. The analog signal is mixed to an IF frequency and passed through a BPF and amplifier section. The IF signal is mixed with a signal from a DCO under control of the processing device 201 to the appropriate channel frequency (e.g., a received from the control node 110 for the appropriate channel, such as the beacon, caretaker, and data channels). The signal is then transmitted by an appropriate BPF/amplifier/antenna combination as selected by a MUX or analog switch under control of the processing device 201. The transmitter 820 may be implemented using a single transmitter that time division multiplexes the data, caretaker, and beacon channels, or multiple transmitters may be used to transmit on all channels as needed.

Caretaker Operations

Figure 9:
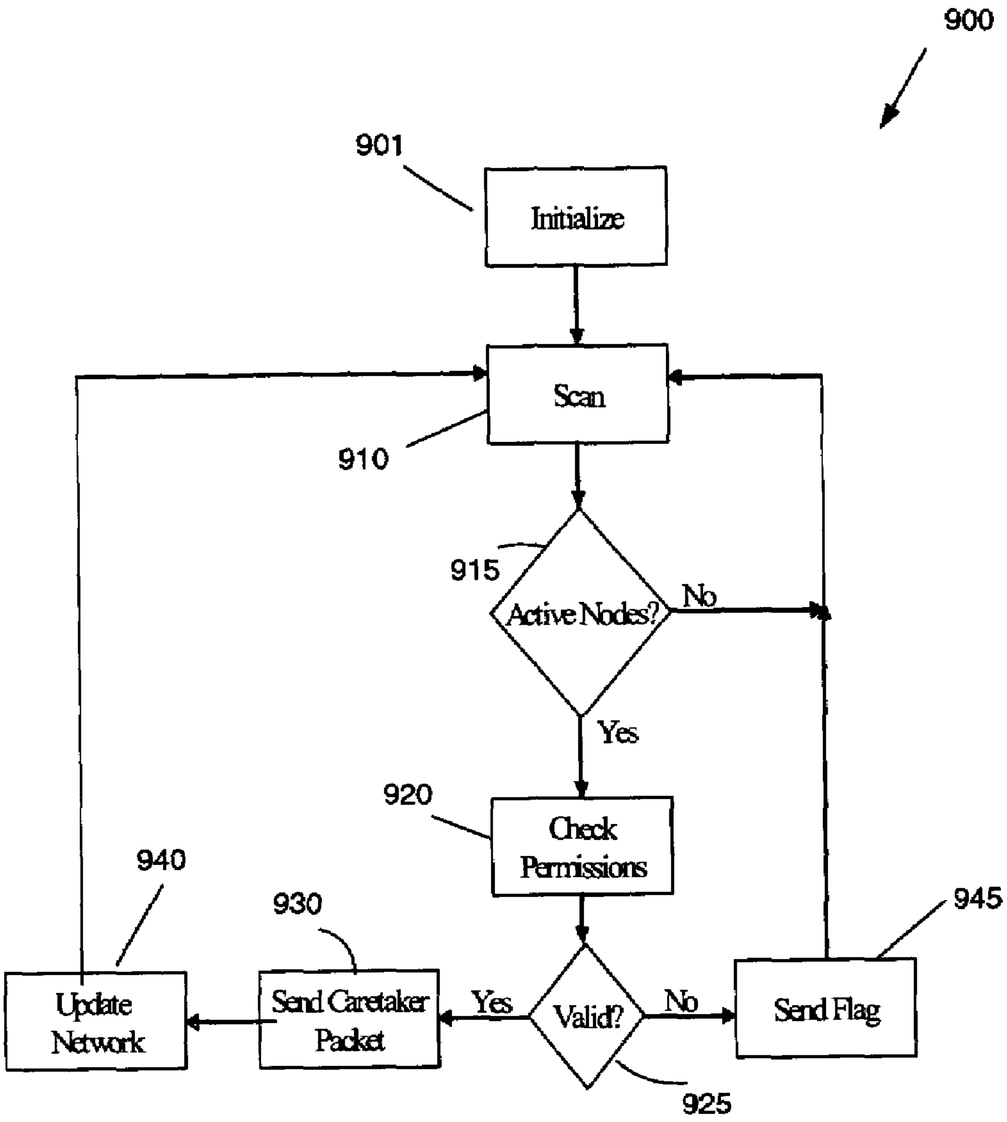
FIG. 9 is an exemplary flow diagram for a caretaker node.

FIG. 9 shows one exemplary flow diagram 900 of operation for the control node 110.

Coming online, the control node 110 is initialized 901. The control node 110 scans the beacon channel and/or caretaker channel for any nodes of the communications system 910. If no nodes are detected 915, the control node 110 continues to scan for nodes. Scanning 910 may be done on periodic basis. If an active node is detected 915, the control node 110 determines if the node is authorized (e.g., using an authorization code transmitted by the node requesting access) 920. If the node is authorized 925, the control node 110 sends a data packet including channel information (e.g., timing, synchronization, and channel frequencies) using the beacon channel 930. The network information is then updated to add the authorized node 940. If the node is not authorized 925, the event may be noted, for example, by indicating a flag condition 945. In either instance, the control node continues to scan for other nodes 910.

Jamming Operations

Figure 10:
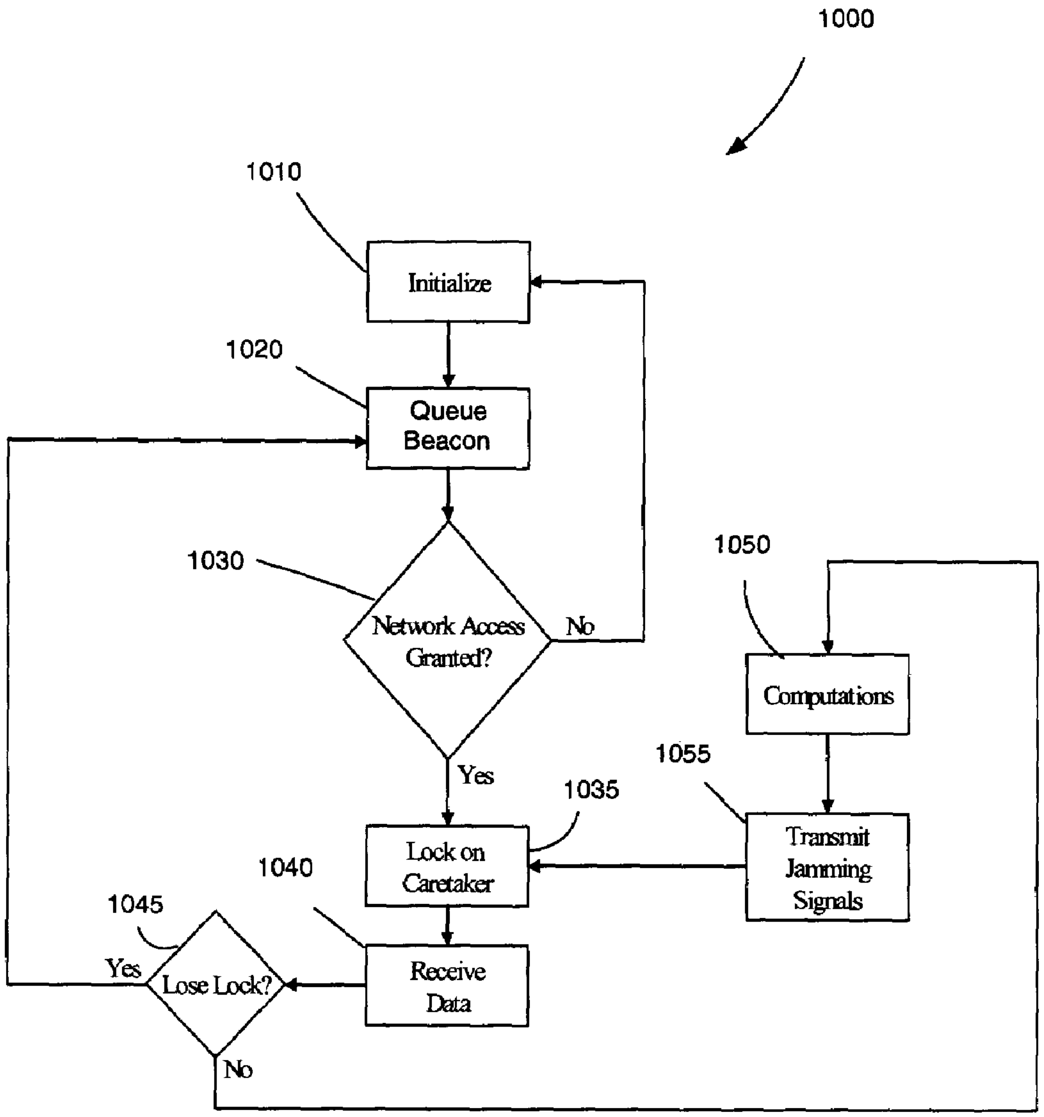
FIG. 10 is an exemplary flow diagram for a jamming node.

FIG. 10 shows an exemplary flow diagram of operation for the jamming node 120. The jamming node 120 is initialized 1000. The jamming node 120 queues a beacon by transmitting a request to the control node 110 for authorization to join the communications system 1020. The jamming node 120 listens to the beacon channel for a response 1030 to form the control node 110. If authorized, the control node 110 transmits a caretaker packet including channel information, such as, for example, the channel frequencies that are to be used (eg, caretaker data, future data, timing data, any special data encoding.) If network access is granted, the jamming node 120 decodes the caretaker packet and locks to the caretaker channel to receive further channel information 1035. If the jamming mode is not authorized, the jamming node may try to reinitialize 1010 and re-queue the beacon 1020 again to join the jammed communications network 100.

Once locked to the caretaker channel, the jamming node 120 may receive data using the data channel 1040. If the lock on the caretaker channel is maintained 1045, the jamming node 120 performs the computations to determine the notches in the jammed frequency spectrum 1050 based on the received channel information and transmits the jamming signals 1055. The jamming node 120 performs channel hopping and locks to the new caretaker channel 1035 and receives updated channel information using the caretaker channel. If the lock to the caretaker channel was maintained 1045, the jamming node 120 performs the necessary computations to determine the new notches for the updated channel information 1050 and transmits the updated jamming signals 1055. If lock is not maintained 1045, the jamming node 120 stops transmitting the jamming signals and may re-queue the beacon 1020 to gain access to the communications network 100.

Communications Operations

Figure 11:
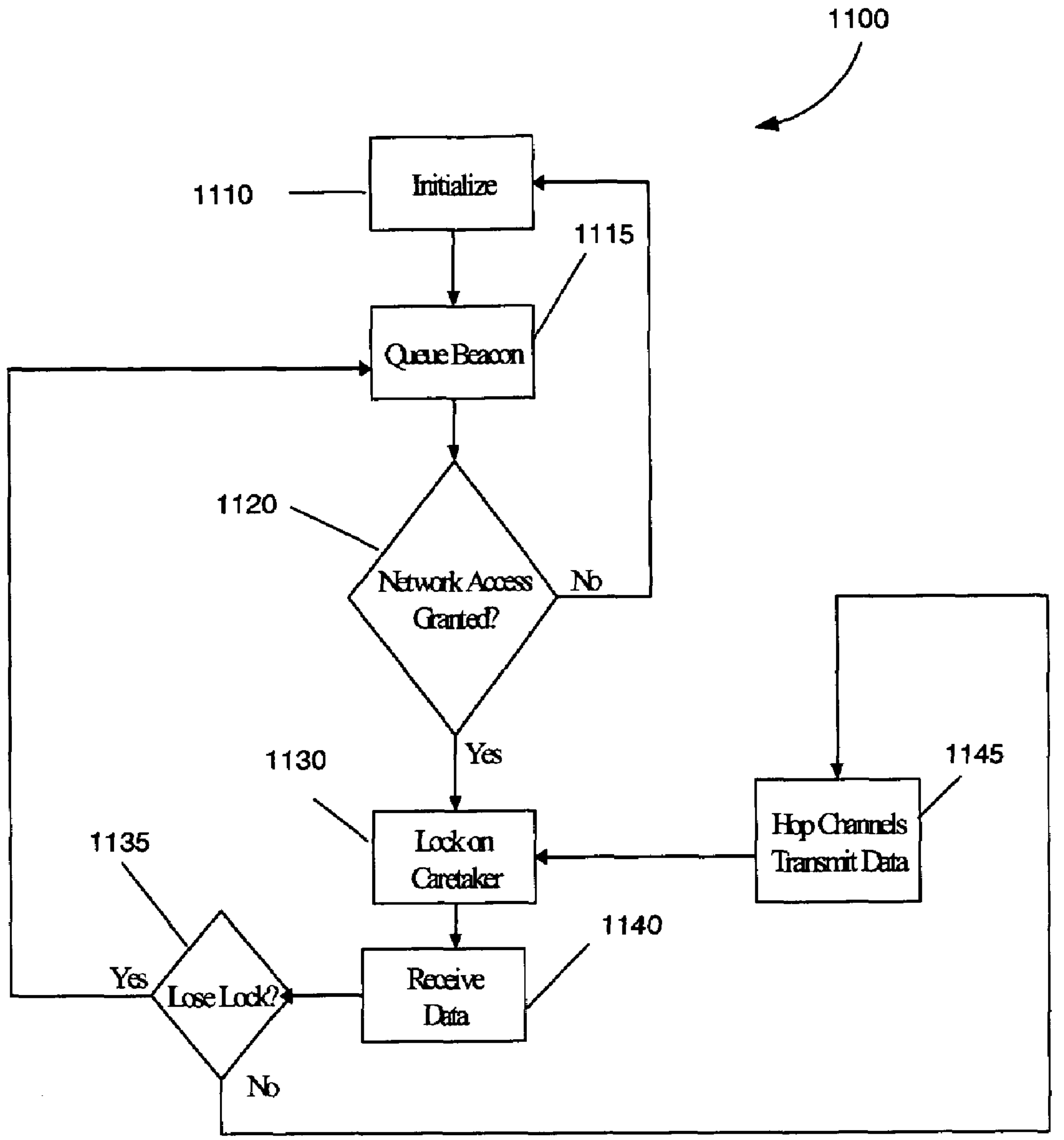
FIG. 11 is an exemplary flow diagram for a communications node.

FIG. 11 shows an exemplary flow diagram 1100 of operation for the communications node 130. The communications node 130 is initialized 1110. The communications node 130 queues the beacon 1115 by transmitting a request to the control node 110 for authorization to join the communications system 100. The communications node 130 listens to the beacon channel for a response 1120 to form the control node 110. If authorized, the control node 110 transmits a caretaker packet including channel information, such as, for example, the channel frequencies that are to be used (e.g., caretaker data, future data, timing data, any special data encoding). The communications node 130 decodes the caretaker packet and locks to the caretaker channel to receive further channel information 1030. If the communications node 130 is not authorized, it may try to reinitialize 1110 and re-queue the beacon 1115 to join the jammed communications system 100.

Once locked to the caretaker channel, the communications node 130 may receive data using the data channel 1135. If lock on the caretaker channel is maintained 1140, the communications node 130 performs channel hopping (e.g., the data channel hops to new data channel and caretaker becomes old data channel) as described above, and the communications node 130 transmits data on the new data channel 1145. As long as the lock to the caretaker channel is maintained, the communications node 130 continues to receive and transmit data. If the lock to the caretaker channel is lost 1140, the communications node 130 re-queues the beacon 1115 to gain access to the communications system 100.

The communications system 100 allows an operator to communicate within a jammed broadband frequency using a frequency hopped clear channel for communications using the data channel. Because the communications system 100 is processor based, the data channel may be created and cleared of RF energy within the jammed spectrum band before transmission (e.g., through use of the future channel). Therefore, the communications nodes 130 do not have to "burn" through the interference and do not require any more transmission power than a conventional RF communicator in a clear or non-jammed environment allowing the system to take up minimum volume. In addition, because the communications system 100 is processor based, the communications system 100 provides better control of the notch bandwidth as well as notch placement within the band. Conventional jamming systems physically open a channel either by sideband and/or carrier suppression or by using an enormous bank of bandpass filters. The roll-off of such conventional systems is difficult to control and is substantially a fixed quantity. However, the digital filtering provided by the communications system described herein allows control of the bandwidth, roll-off, and notch agility using the processing devices. As a result, the jamming communications system is able to customize the resolution and agility of each notch, and the system may be customized and improved as needed with software and compatible hardware as need or availability arises. Furthermore, limitations of how closely spaced notch frequencies may be reduced. The beacon channel in conjunction with the caretaker channel provide denial of service to unauthorized communications systems, and provide for changing coding, clocking, and frequency hopping characteristics in real time. As a result, an extremely secure communications environment is provided within the jammed area 103.

The jamming communications system 100 also provides for traveling nodes (e.g., jamming nodes 120 and/or communications nodes 130) that come online, enter, or leave a jammed area 103 allowing the nodes to transition to and from the jamming area 102, while maintaining operability of all authorized nodes within the environment. Because nodes may transition to and from the jammed area 103, the jamming communications system 100 may be deployed on mobile platforms, such as, for example, vehicles, aircraft (including fixed and non fixed wing) and marine craft to provide jamming of both elevated and offshore environments as needed.

Additional nodes can always be added through a primary control node using the caretaker channel. A hand-off procedure may be based on the permission level or "authority" of any incoming node. For example, a simple communication node may not be given system "authority"; however, if a mobile network system that included control, jamming, and communication nodes, such as, for example, a VIP convoy entered a jamming area, then the a control authority may be negotiated between the nodes to determine whether or not handoff of control of the network was appropriate. The authority level of the nodes may be established using the beacon channel.

As stated previously, the control node 110 and the communications node 130 do not have to be purely processor based systems but may employ a hybrid analog/digital system. As a result, conventional communications systems may be adapted for integration with the jamming communications system 100, although the most secure communications system is completely digital. For example, the voice data from the communications node 130 may remain in analog form and be mixed to the proper transmission frequency through processor control of a DCO and antenna path of the analog signal. Likewise, the control node 110 may incorporate a communications capability over the data channel using the same technique. The control node 110 also may employ a simple processor based system with human and data storage interfaces.

A number of exemplary implementations have been described. Nevertheless, it will be understood that various modifications may be made. For example, suitable results may be achieved if the steps of described techniques are performed in a different order and/or if components in a described component, system, architecture, or devices are combined in a different manner and/or replaced or supplemented by other components. Accordingly, other implementations are within the scope of the following claims.

What is claimed is:

1. A communications system for jamming radio frequency (RF) communications of an unauthorized device within a broadband frequency spectrum within a jammed area, the system comprising:

a control node including a processor to determine RF channel information for at least one communications channel within the broadband frequency spectrum;

at least one authorized jamming node to transmit RF signals to jam RF communications within the broadband frequency spectrum and to create notches within the broadband frequency spectrum clear of RF energy corresponding to said communications channel based on said RF channel information; and at least one communications device authorized by said control node to communicate using said communications channel located within said notches, wherein said communications channel includes a caretaker channel to provide synchronization data and said channel information to authorized jamming nodes and communications devices.

2. The system of claim 1 wherein said communications channel includes a data channel for communications between authorized communications devices.

3. The system of claim 2 further comprising a future data communications channel wherein communications on said communications channels are frequency hopped under direction of said control node such that said future data channel becomes a new data channel; said data channel becomes said caretaker channel, said notch corresponding to said caretaker channel is jammed, and a new future data and corresponding notch clear of RF energy are created.

4. The system of claim 1 wherein said jamming node includes a processor to filter noise data based on the communications channel data to determine jamming data to create a jammed broadband frequency spectrum with notches clear of RF energy corresponding to said communication channel.

5. The system of claim 1 wherein said communications channel includes a beacon channel monitored by the processor of said control node to authorize said communication device to use said communications channel and to provide said channel information to said authorized communications device allowing said communications said to enter the jammed area and communicate using said communications channel.

6. The system of claim 1 wherein said communications channel includes a beacon channel monitored by the processor of said control node to authorize jamming nodes to use said communications channel and to provide said channel information to authorized jamming nodes allowing said jamming node to enter the jammed area and begin jamming of the broadband frequency spectrum.

7. A jamming node for jamming radio frequency (RF) communication channels of an unauthorized device within a broadband frequency spectrum, said jamming node comprising;

a receiver to receive channel information from a control node for communication channels within the broadband frequency spectrum;

a processor to filter noise data based on, said channel information and to determine jamming data from which to create a jammed broadband frequency spectrum with notches clear of RF energy corresponding to the communication channels;

a broadband frequency transmitter under control of said processor to transmit signals for jamming the broadband frequency spectrum; and a notched spectrum transmitter under control of said processor to create said notches within the broadband frequency spectrum corresponding to the communication channels, wherein the communication channels include a caretaker channel to provide synchronization data and said channel information to authorized jamming nodes and communications devices.

8. The jamming node of claim 7 wherein the communication channels include an authorized data channel for communications between authorized communications devices.

9. A jamming node for jamming radio frequency (RF) communication channels of an unauthorized device within a broadband frequency spectrum, said jamming node comprising:

a receiver to receive channel information from a control node for communication channels within the broadband frequency spectrum;

a processor to filter noise data based on said channel information and to determine jamming data from which to create a jammed broadband frequency spectrum with notches clear of RF energy corresponding to the communication channels;

a broadband frequency transmitter under control of said processor to transmit signals for jamming the broadband frequency spectrum; and a notched spectrum transmitter under control of said processor to create said notches within the broadband frequency spectrum corresponding to the communication channels;

a future data communications channel wherein communications on the communication channels are frequency hopped under direction of said control node such that said future data channel becomes a new data channel, said data channel becomes said caretaker channel, said notch corresponding to said caretaker channel is jammed, and a new future data and corresponding notch clear of RF energy are created.

10. A communications node for a jamming communications system that jams radio frequency (RF) communications of an unauthorized device within a broadband frequency spectrum, said communications node comprising:

a receiver to receive channel information from a control node corresponding to notches within the jammed broadband frequency spectrum that are clear of RF energy;

a processor to process said channel information from which to determine a communications channel used by the communications system corresponding to said notches and to process a communication for transmission with the communications system; and a transmitter under control of said processor to transmit said communication using said determined channel identified by said channel information, wherein said processor provides frequency hopping using said communications channels for producing secure communications within the jammed broadband frequency spectrum, said communications channels include a caretaker channel to provide synchronization data and said channel information to an authorized communications device.

11. The communications node of claim 10 wherein paid communications channels include a data channel for communications between said authorized communications device and another authorized communications device.

12. The communications node of claim 11 further comprising a future data communications channel wherein communications on said communications channels are frequency hopped under direction of said control node where said future data channel becomes a new data channel, said data channel becomes said caretaker channel, said notch corresponding to said caretaker channel that jammed, and a new future data channel and corresponding notch clear of RF energy are created.

13. The communications node of claim 10 wherein said communications channels include a beacon channel to transmit an authorization code by said transmitter under control of said processor to request authorization to communicate using said communications channels and to receive said channel information when authorized by said control node.

14. A method of jamming radio frequency (RF) communications of an unauthorized device within a broadband frequency spectrum within a jammed area, said method comprising:

determining RF channel information for at least one communications channel within the broadband frequency spectrum;

transmitting RF signals to jam the RF communications within the broadband frequency spectrum based on said RF channel information;

creating notches in the broadband frequency spectrum clear of RF energy corresponding to said communications channel; and communicating through said communications channel located within said notches, wherein determining said RF communications channel includes determining a caretaker channel to provide synchronization data and said RF channel information to authorized devices.

15. The method of claim 14 wherein determining said RF communications channel includes determining a data channel for communications between authorized devices.

16. of claim 15 further comprising:

determining a future data communications channel;

frequency hopping said communications channel where said future data channel becomes a new data channel and said data channel becomes said caretaker channel;

jamming said notch corresponding to said caretaker channel; and creating a new future data and corresponding notch clear of RF energy.

17. A method of jamming radio frequency (RF) communications of an unauthorized device within a broadband frequency spectrum within a jammed area, said method comprising:

determining RF channel information for at least one communications channel within the broadband frequency spectrum;

transmitting RF signals to jam the RF communications within the broadband frequency spectrum based on said RF channel information;

creating notches in the broadband frequency spectrum clear of RF energy corresponding to said communications channel;

communicating through said communications channel located within said notches;

determining a beacon communications channel;.

monitoring said beacon channel for a device seeking authorization;

determining said device is authorized as an authorized device; and providing synchronization and said channel information to said authorized device to allow said device to enter the jammed area and communicate within the jammed broadband frequency spectrum.

* * * * *